United States Patent
Nemetz et al.

(10) Patent No.: US 11,369,837 B2
(45) Date of Patent: Jun. 28, 2022

(54) FOLDING EXERCISE BIKE

(71) Applicant: Breakaway Industries LLC, Carpinteria, CA (US)

(72) Inventors: Connor Nemetz, Carpinteria, CA (US); John Stump, Santa Barbara, CA (US)

(73) Assignee: Breakaway Industries LLC, Carpinteria, CA (US)

( * ) Notice: Subject to any disclaimer, the term of this patent is extended or adjusted under 35 U.S.C. 154(b) by 0 days.

(21) Appl. No.: 17/159,930

(22) Filed: Jan. 27, 2021

(65) Prior Publication Data

US 2021/0387053 A1 Dec. 16, 2021

Related U.S. Application Data

(60) Provisional application No. 63/038,694, filed on Jun. 12, 2020.

(51) Int. Cl.
*A63B 22/06* (2006.01)
*A63B 21/00* (2006.01)
(Continued)

(52) U.S. Cl.
CPC .... *A63B 22/0605* (2013.01); *A63B 21/00069* (2013.01); *A63B 21/225* (2013.01);
(Continued)

(58) Field of Classification Search
CPC ............ A63B 22/0605; A63B 21/4035; A63B 21/0052; A63B 21/0058; A63B 24/0062; A63B 71/0622; A63B 21/00069; A63B 21/00076; A63B 21/005; A63B 21/225; A63B 22/0046; A63B 24/0087; A63B 23/0476; A63B 2071/0677; A63B 2220/05; A63B 2220/807; A63B 2225/096; A63B 2071/0638; A63B 2022/0623; A63B 2225/09; A63B 2024/0093; A63B 2225/093; A63B 2022/0617; A63B 2022/0033; A63B 2022/0641; A63B 2220/64; A63B 2220/80; A63B 2220/833; A63B 2220/18; A63B 2220/30; A63B 2024/009; A63B 2220/10; A63B 2225/20;
(Continued)

(56) References Cited

U.S. PATENT DOCUMENTS 3,578,800 A * 5/1971 DiNepi .............. A63B 22/0605
482/57
5,071,117 A * 12/1991 Mautner ............ A63B 22/0007
482/57
(Continued)

FOREIGN PATENT DOCUMENTS

KR 200442113 Y1 * 8/2008 ......... A63B 22/0605

*Primary Examiner* — Andrew S Lo
*Assistant Examiner* — Andrew M Kobylarz
(74) *Attorney, Agent, or Firm* — Young Basile Hanlon & MacFarlane, P.C.

(57) ABSTRACT

A folding exercise bike can be easily assembled and disassembled/folded for storage and/or transportation. The exercise bike can include a telescoping seat, a telescoping stem, a fold to stow handlebar and fold down locking legs. Various configurations for the exercise bike can be used. The exercise bike can include a wireless transmitter to transmit cycling data to a user's portable electronic device.

20 Claims, 16 Drawing Sheets

(51) Int. Cl.
   *F03G 3/08*     (2006.01)
   *A63B 21/22*    (2006.01)

(52) U.S. Cl.
   CPC ............ *A63B 21/4033* (2015.10); *F03G 3/08*
      (2013.01); *A63B 2022/0623* (2013.01); *A63B*
      *2210/50* (2013.01); *A63B 2225/093* (2013.01)

(58) Field of Classification Search
   CPC ...... A63B 2220/803; A63B 2024/0096; A63B
                  2071/0644; A63B 2220/40; A63B
             2209/08; A63B 2225/50; B62M 9/1246;
                              B62M 9/134; F03G 3/08
   See application file for complete search history.

(56)             References Cited

U.S. PATENT DOCUMENTS

| | | | |
|---|---|---|---|
| 6,229,224 B1* | 5/2001 | Gagne | A63B 21/0053 |
| | | | 290/1 A |
| 2002/0016236 A1* | 2/2002 | Stearns | A63B 21/155 |
| | | | 482/57 |
| 2005/0143226 A1* | 6/2005 | Heidecke | A63B 22/0023 |
| | | | 482/62 |
| 2012/0088634 A1* | 4/2012 | Heidecke | A63B 22/0005 |
| | | | 482/2 |
| 2015/0238805 A1* | 8/2015 | Yang | A63B 23/0405 |
| | | | 482/57 |
| 2020/0197776 A1* | 6/2020 | Gonzalez | A63B 69/0079 |
| 2020/0289882 A1* | 9/2020 | Pena | A63B 22/0694 |

* cited by examiner

FOLDING EXERCISE BIKE

CROSS-REFERENCE TO RELATED APPLICATIONS

This application claims the benefit of priority of U.S. provisional patent application No. 63/038,694, filed Jun. 12, 2020, the contents of which are herein incorporated by reference.

BACKGROUND OF THE INVENTION

1. Field of the Invention

Embodiments of the invention relate generally to exercise devices. More particularly, embodiments of the invention relate to a folding exercise bike that can be easily deployed for use and stored.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Exercise equipment that folds for storage is known. For example, an exercise bike can include a first section that extends from feet to handlebars and a second section that extends from feet to a seat, with pedals on a bottom end of the second section. These conventional bikes have a pivot between the first and second sections, allowing folding of the bike for storage. Such bikes, however, require substantial space, even though the footprint may be reduced by folding. Other exercise bikes may eliminate handlebars or seats, for example, to allow the pedal apparatus to be portable. While these devices are relatively portable, such devices lack features of conventional exercise bikes.

As can be seen, there is a need for an improved folding exercise bike that can store in a relatively small space that allows for portability.

SUMMARY OF THE INVENTION

Embodiments of the present invention provide a folding exercise bike comprising handlebars; handlebar telescoping members having a first handlebar telescoping member end attached to the handlebars; a seat; seat telescoping members having a first seat telescoping member end attached to the seat; a lower frame member interconnecting a second opposite end of the seat telescoping members and the handlebar telescoping members; a drive wheel turnable by pedals; a tension adjuster providing resistance to rotation of the drive wheel; and a plurality of legs supporting the lower frame member on a surface, each of the plurality of legs movable between a deployed position for use of the folding exercise bike, and a folded position with the legs folded upward toward either the seat or the handlebars.

Embodiments of the present invention further provide a folding exercise bike comprising handlebars; handlebar telescoping members having a first handlebar telescoping member end attached to the handlebars; a seat; seat telescoping members having a first seat telescoping member end attached to the seat; a lower frame member interconnecting a second opposite end of the seat telescoping members and the handlebar telescoping members; an upper frame member interconnecting lowermost ones of the handlebar telescoping members and the seat telescoping members; a drive wheel turnable by pedals; a flywheel turnable by the drive wheel; a tension adjuster providing resistance to rotation of the flywheel; a plurality of legs supporting the lower frame member on a surface, each of the plurality of legs movable between a deployed position for use of the folding exercise bike, and a folded position with the legs folded upward toward either the seat or the handlebars; a charge port formed in the handlebars; a battery pack; a charge cord extending inside the handlebar telescoping members and interconnecting the battery pack with the charge port; and a retracting reel to automatically retract the charge cord when the handlebar telescoping members are moved into a folded position.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
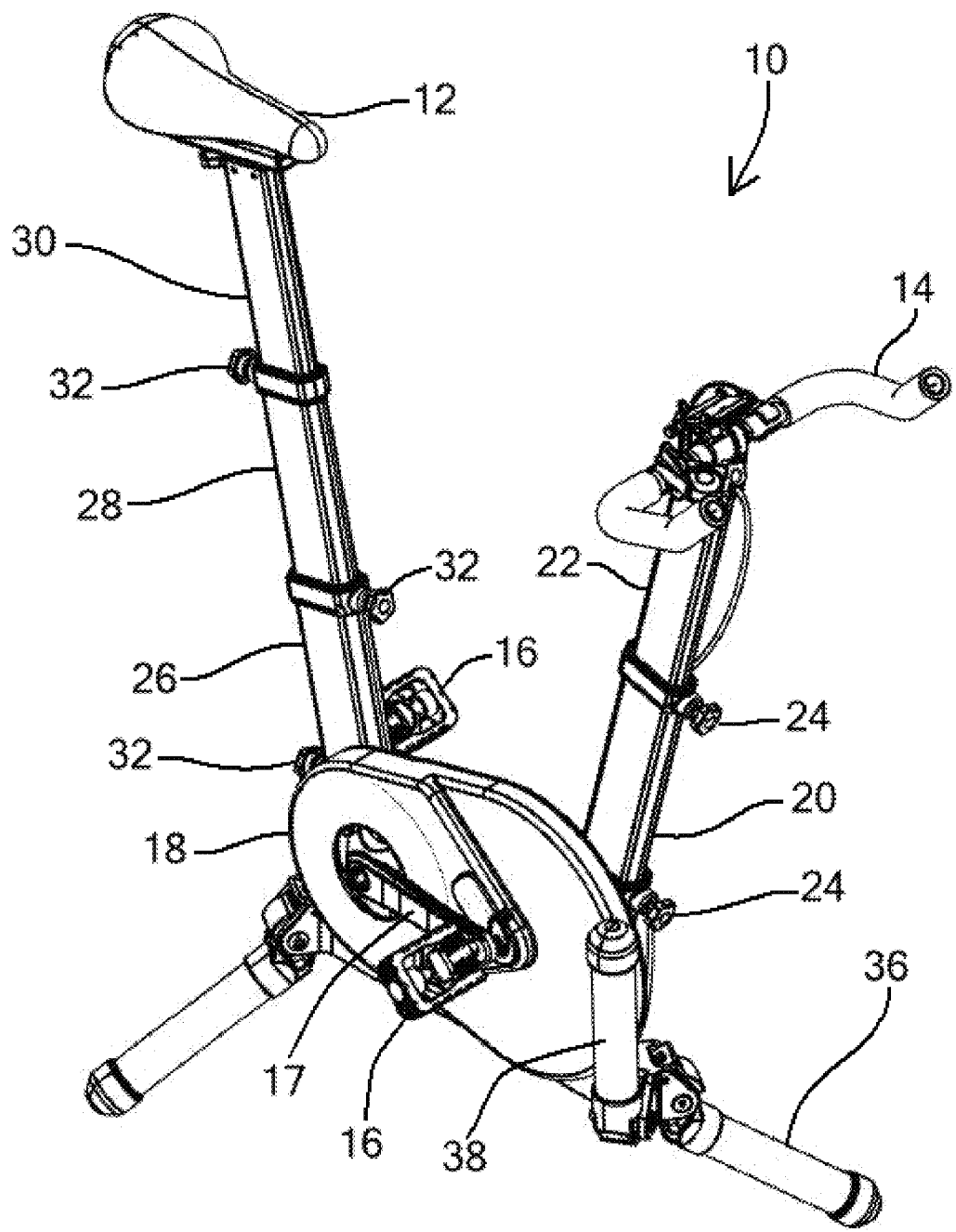
FIG. 1 illustrates a perspective view of a folding exercise bike according to an exemplary embodiment of the present invention.
Figure 2:
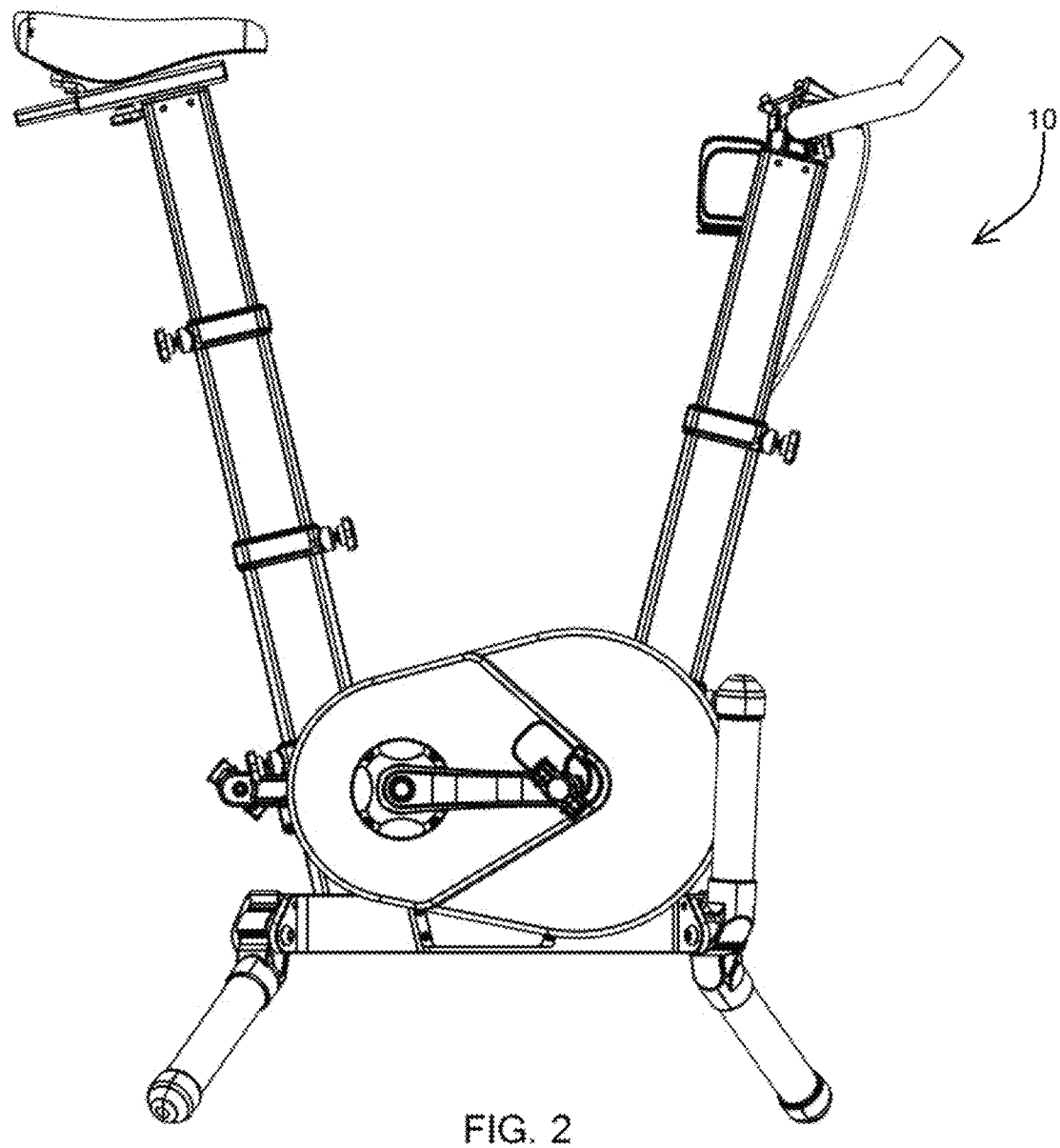
FIG. 2 illustrates a right side view of the folding exercise bike of FIG. 1.
Figure 3:
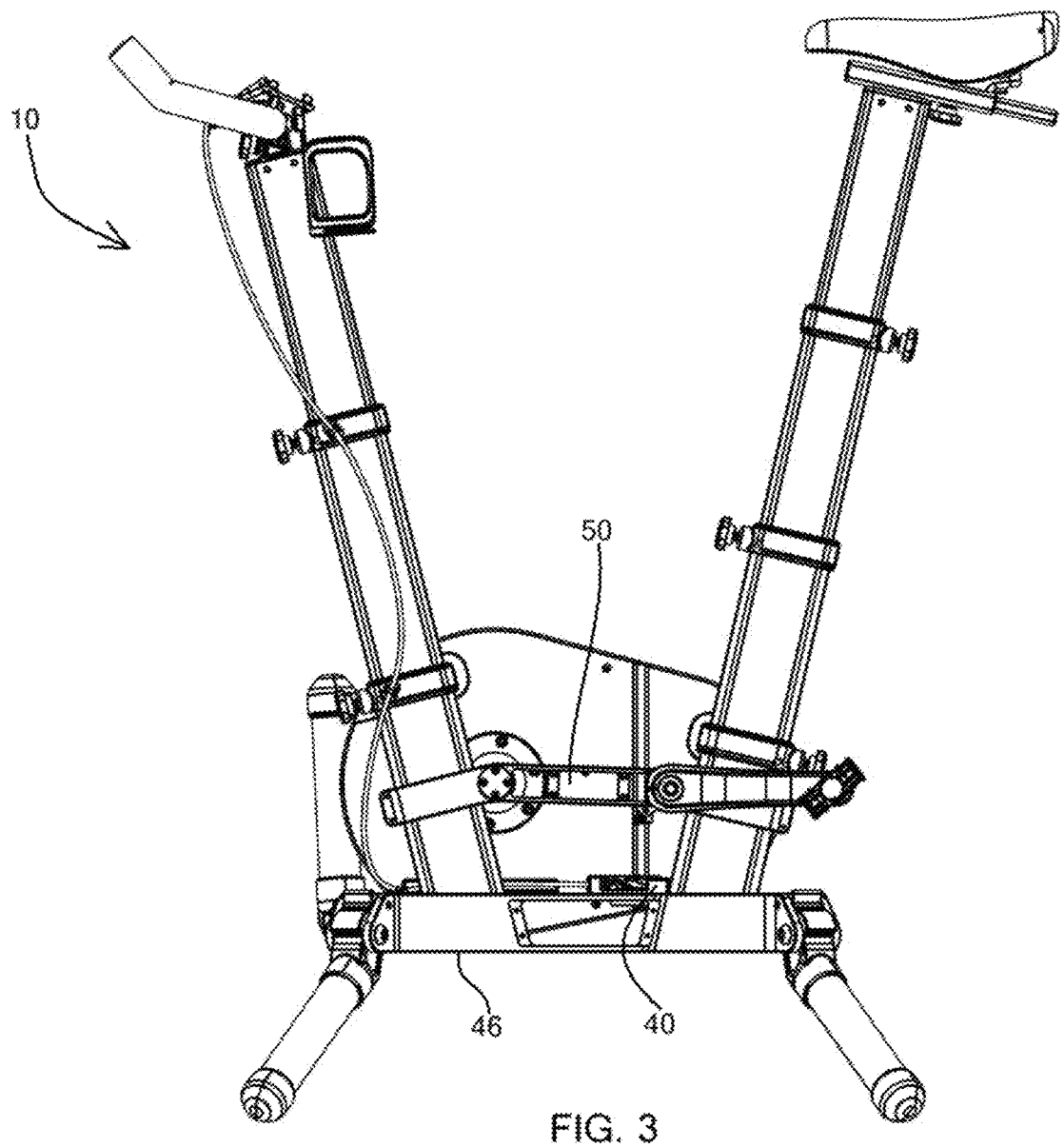
FIG. 3 illustrates a left side view of the folding exercise bike of FIG. 1.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any apparatus, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a folding exercise bike that can be easily assembled and disassembled/folded for storage and/or transportation. The exercise bike can include a telescoping seat, a telescoping stem, a fold to stow handlebar and fold down locking legs. In some embodiments, the exercise bike, in its fully folded configuration, can be sized no larger than an airline carry-on bag size maximum. Various configurations for the exercise bike can be used. The exercise bike can include a wireless transmitter to transmit cycling data to a user's portable electronic device.

Referring to FIGS. 1 through 6, a folding exercise bike 10, also referred to simply as bike 10, can include a seat 12 and a handlebar 14 each attached to telescoping members including seat telescoping members 26, 28, 30 and handlebar telescoping members 20, 22.

A lower frame member 46 can connect lower ends of a lower seat telescoping member 26 and a lower handlebar telescoping member 20. An upper frame member 50 can support the lower seat telescoping member 26 and the lower handlebar telescoping member 20 and a desired angle. The upper frame member 50 can also support the drive wheel 60, crank arms 17, and fly wheel 62 (see FIG. 8).

A plurality of legs 36 can extend from the lower frame member 46. The legs are moveable between extended positions, as illustrated by leg 36, and folded positions, as illustrated by leg 38. Details of the folding of the legs are described below.

While FIG. 1 shows two handlebar telescoping members 20, 22 and three seat telescoping members 26, 28, 30, it should be understood that other quantities of telescoping members may be used, depending on the height desired by the user. As discussed in greater detail below, handlebar telescoping member clamps 24 may be used to adjust a height of the handlebars 14 while seat telescoping member clamps 32 may be used to adjust a height of the seat 12. A housing 18 may cover the drive wheel 60 and the fly wheel 62, as discussed in greater detail below.

Figure 4:
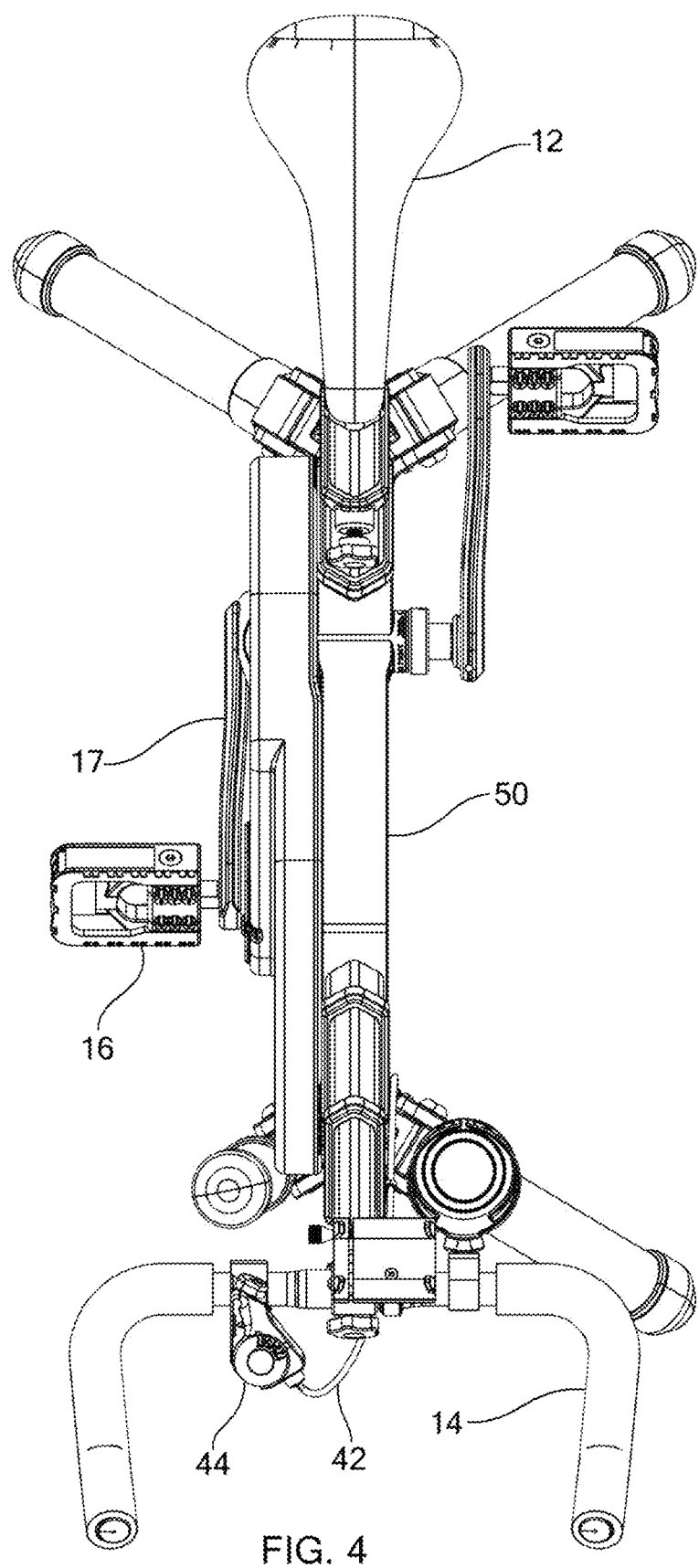
FIG. 4 illustrates a top view of the folding exercise bike of FIG. 1.
Figure 5:
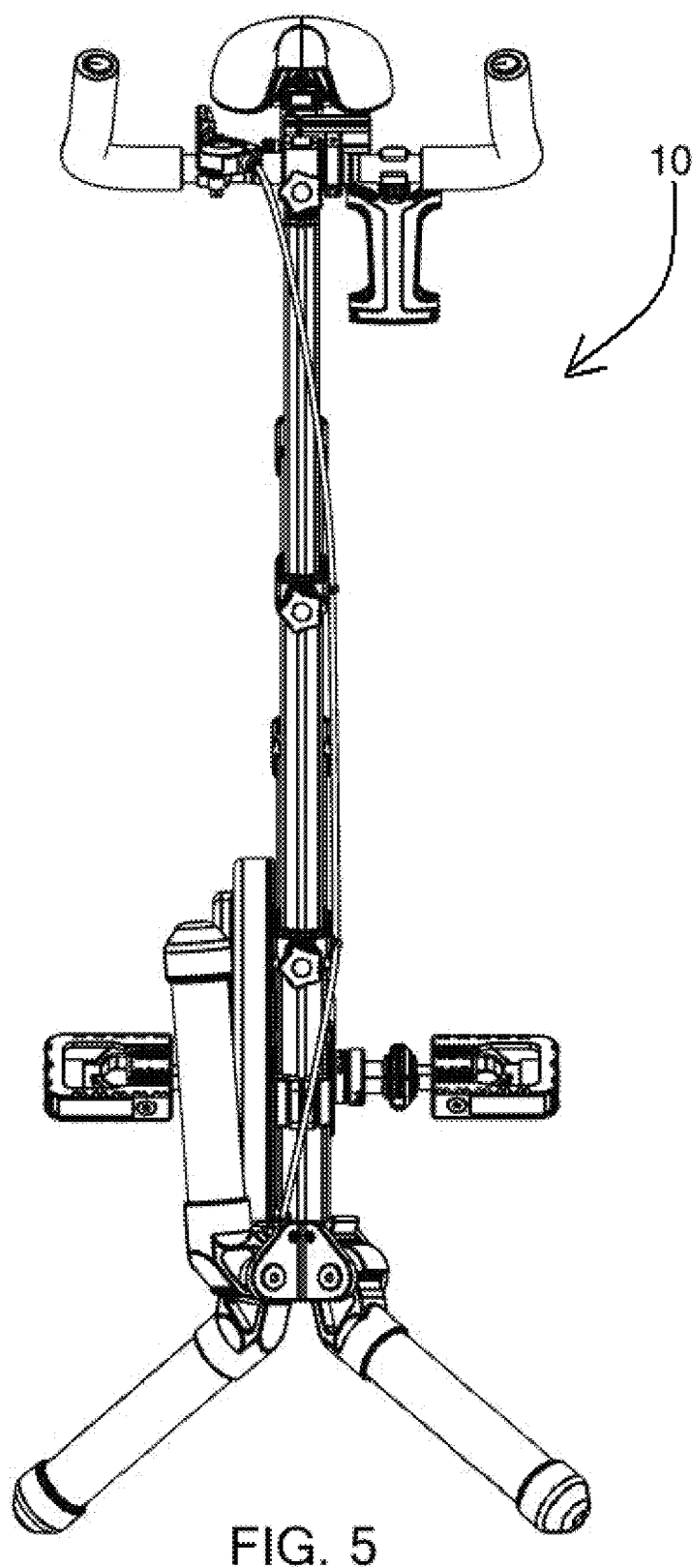
FIG. 5 illustrates a front view of the folding exercise bike of FIG. 1.
Figure 6:
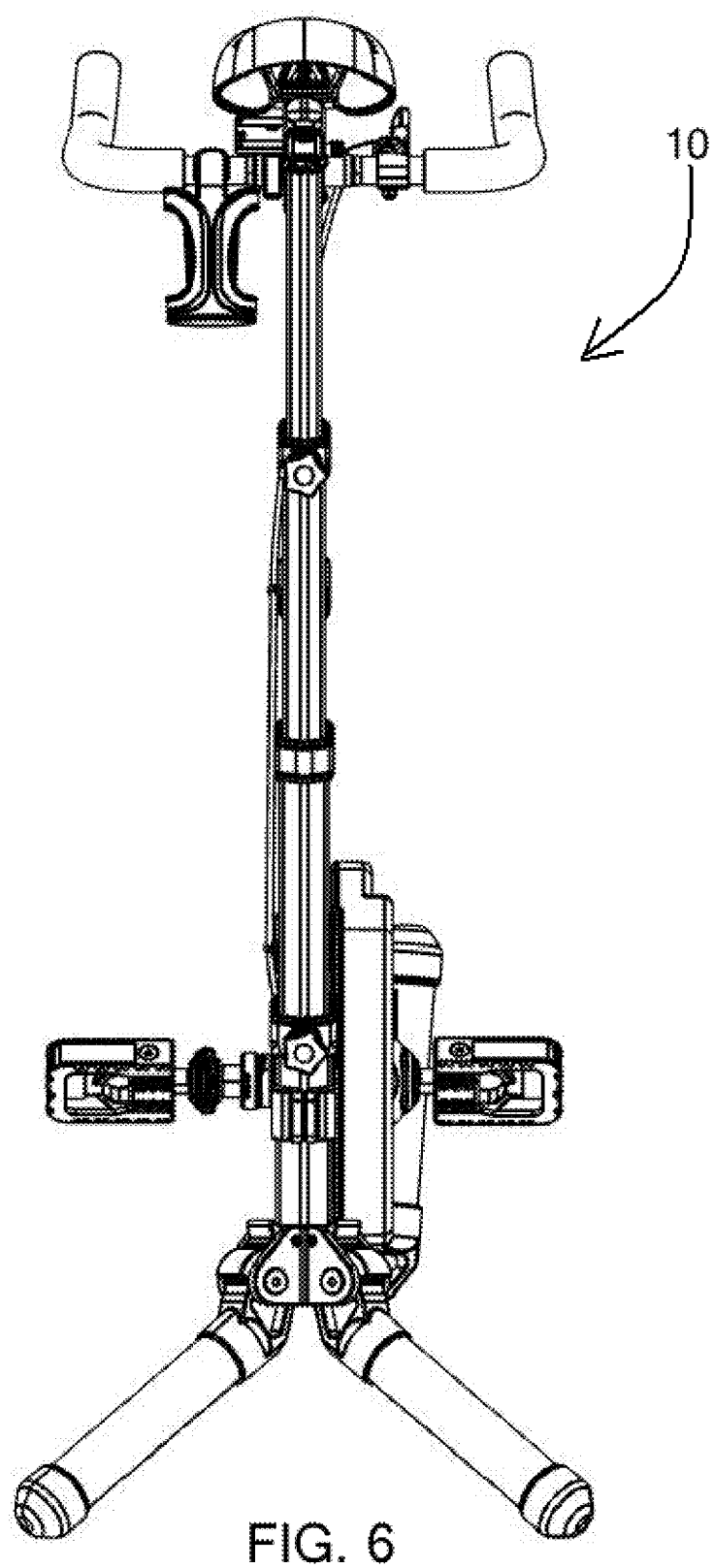
FIG. 6 illustrates a back view of the folding exercise bike of FIG. 1.
Figure 7:
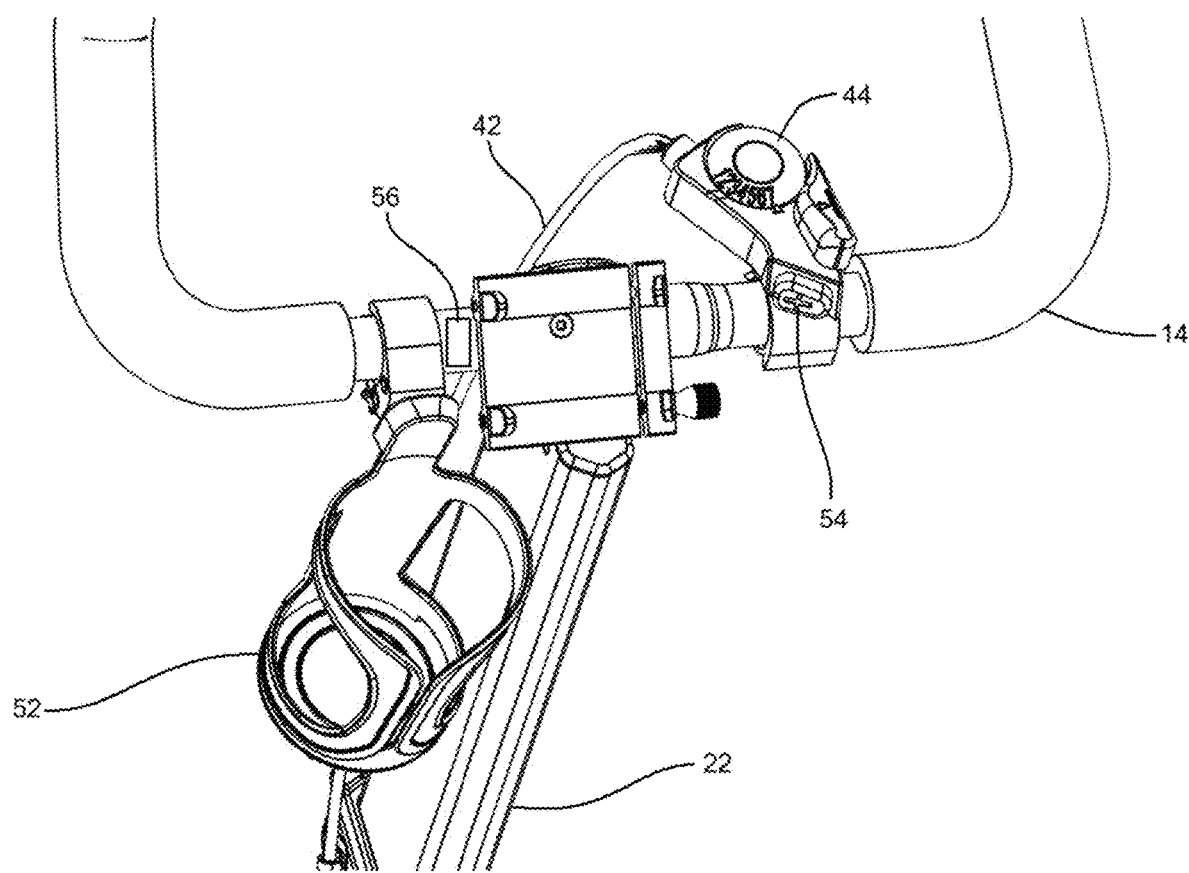
FIG. 7 illustrates a detailed view of the handlebars of the folding exercise bike of FIG. 1.
Figure 9:
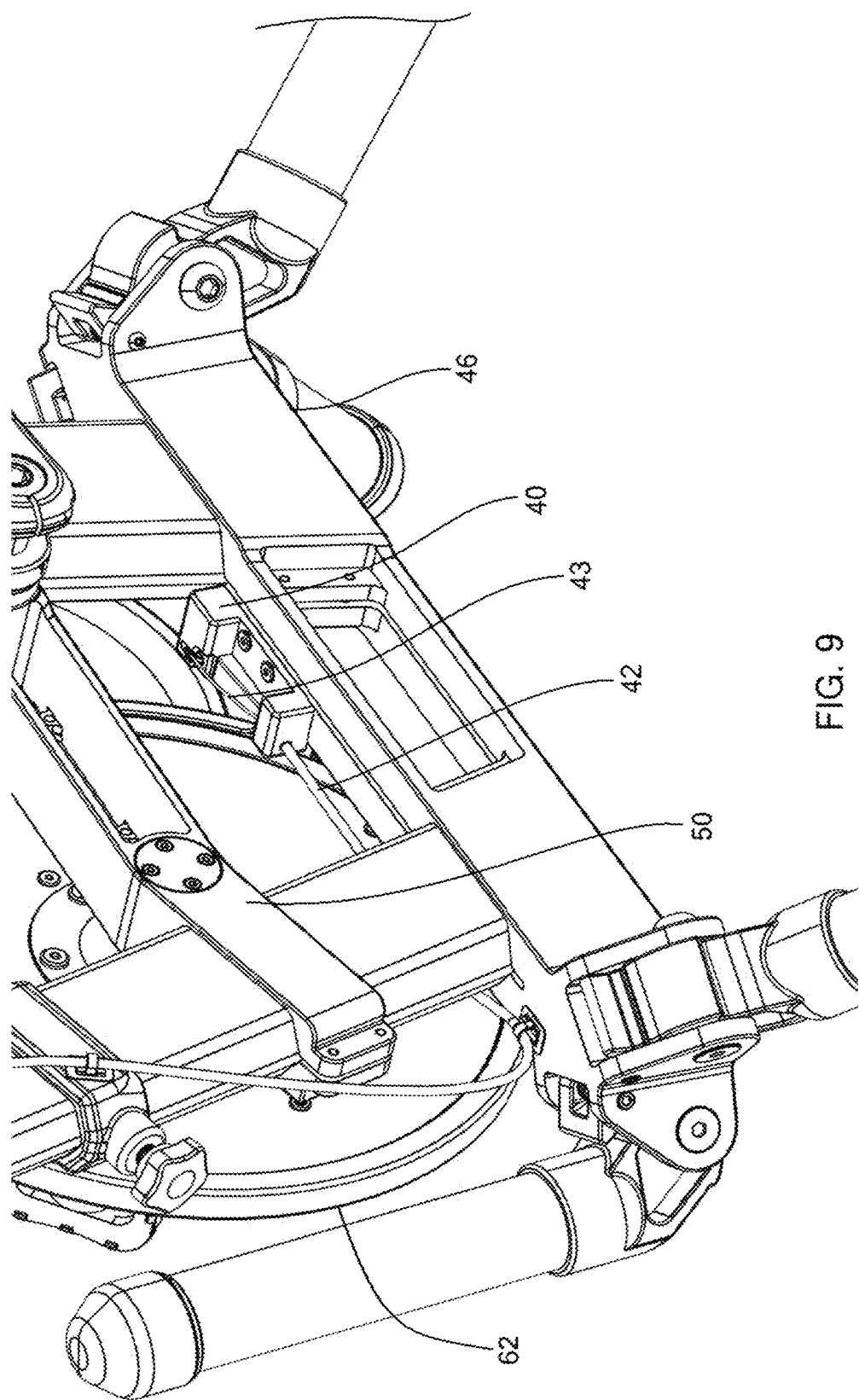
FIG. 9 illustrates a detail view of a variable resistance mechanism of the folding exercise bike of FIG. 1.
Figure 12:
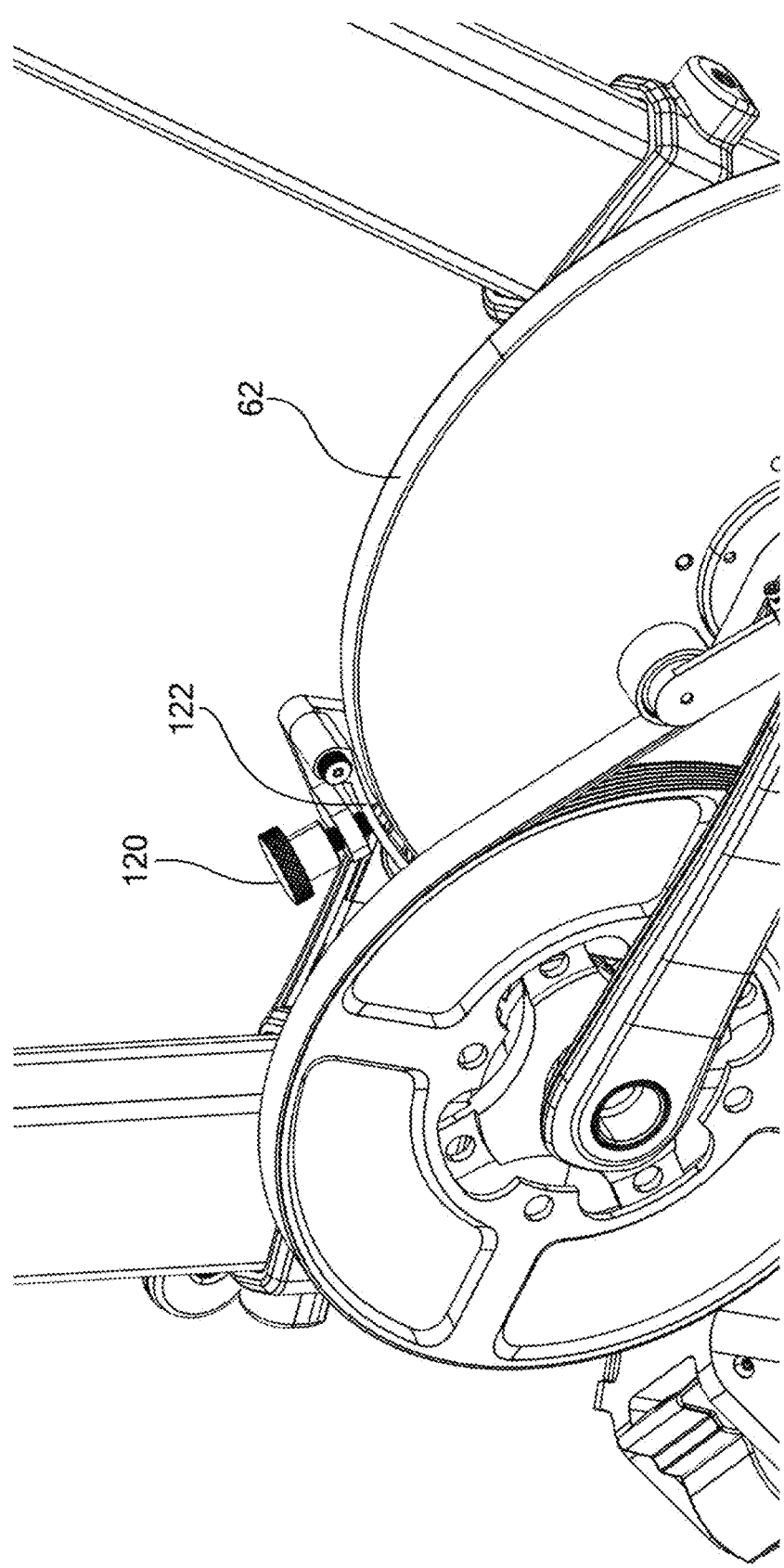
FIG. 12 illustrates a detailed view of an alternate variable resistance mechanism usable on the folding exercise bike of FIG. 1.

A tension adjuster 44 can be mounted on the handlebar 14 as best seen in FIG. 4, where a user can select a tension (via tension button 54 as shown in FIG. 7, for example) to be applied, via a tensioner 40, against the flywheel 62 via tension cable 42. In some embodiments, the tension cable 42 can encase a movable cable 43 (see FIG. 9) that moves to adjust a pressure of a tensioner against the flywheel 62. Other tension adjustment mechanisms may be utilized as well, such as a tension plate 122 attached to a screw knob 120, as illustrated in FIG. 12, where adjustment of the screw knob adjusts an amount of pressure applied against the flywheel 62 by the tension plate 122. The tension cable 42 may be a coiled cable that permits operation of the cable when the bike is deployed but coils to prevent slack in the cable when the bike is folded.

In some embodiments, the tension adjuster 44 can provide a mechanism to adjust the tension via various resistance mechanisms, such as friction resistance and magnetic resistance. The tension button 54 can include multiple buttons to adjust both types of resistance, such that a user can separately adjust the amount of friction resistance and magnetic resistance.

The handlebar 14, as shown in FIG. 7, can further include a device holder 50, a drink holder 52 and a charge port 56. The charge port 56 may be any standard power port, such as a female universal serial bus (USB) port. In some embodiments, the device holder 50 can have an integrated charging adapter designed for a particular device, where power for the device holder 50 can be provided by the same power supply powering the charge port 56. Additional details regarding power supplied to the port 56 are discussed in greater detail below.

Figure 8:
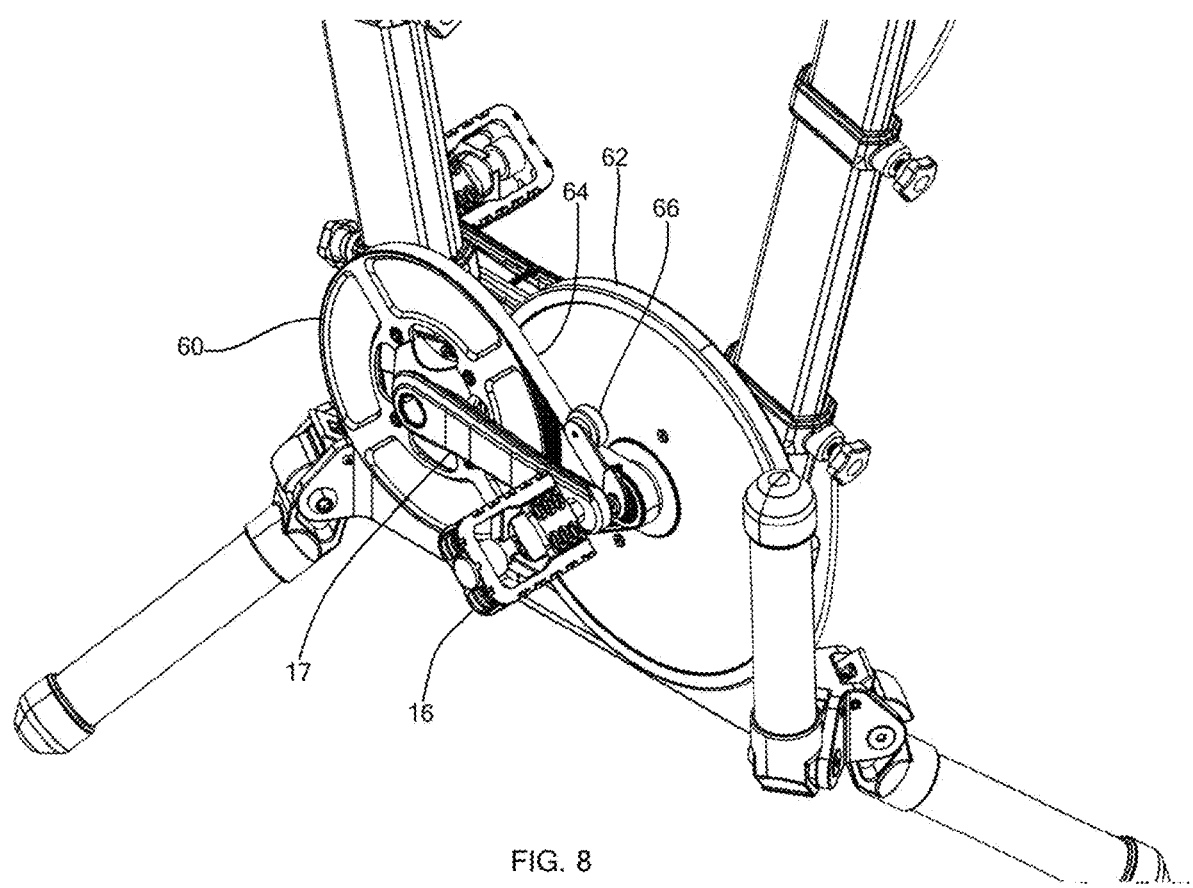
FIG. 8 illustrates a detail view of the flywheel drive mechanism, with the flywheel cover removed for clarity, of the folding exercise bike of FIG. 1.

Referring to FIG. 8, the drive mechanism (with the cover 18 removed) is illustrated, where the drive wheel 60 is driven by pedals 16 attached to crank arms 17, where a pedaling motion provided by the user turns the drive wheel 60. A belt 64 rotationally connects the drive wheel 60 to a flywheel 62, where as the drive wheel 60 is driven by the user, the flywheel 62 also turns. The flywheel 62, as known in the art, may be weighted and sized to provide a feel like a conventional bicycle being ridden by the user. A belt tensioner 66 can be used to keep tension on the belt 64 and prevent slipping thereof.

Figure 10:
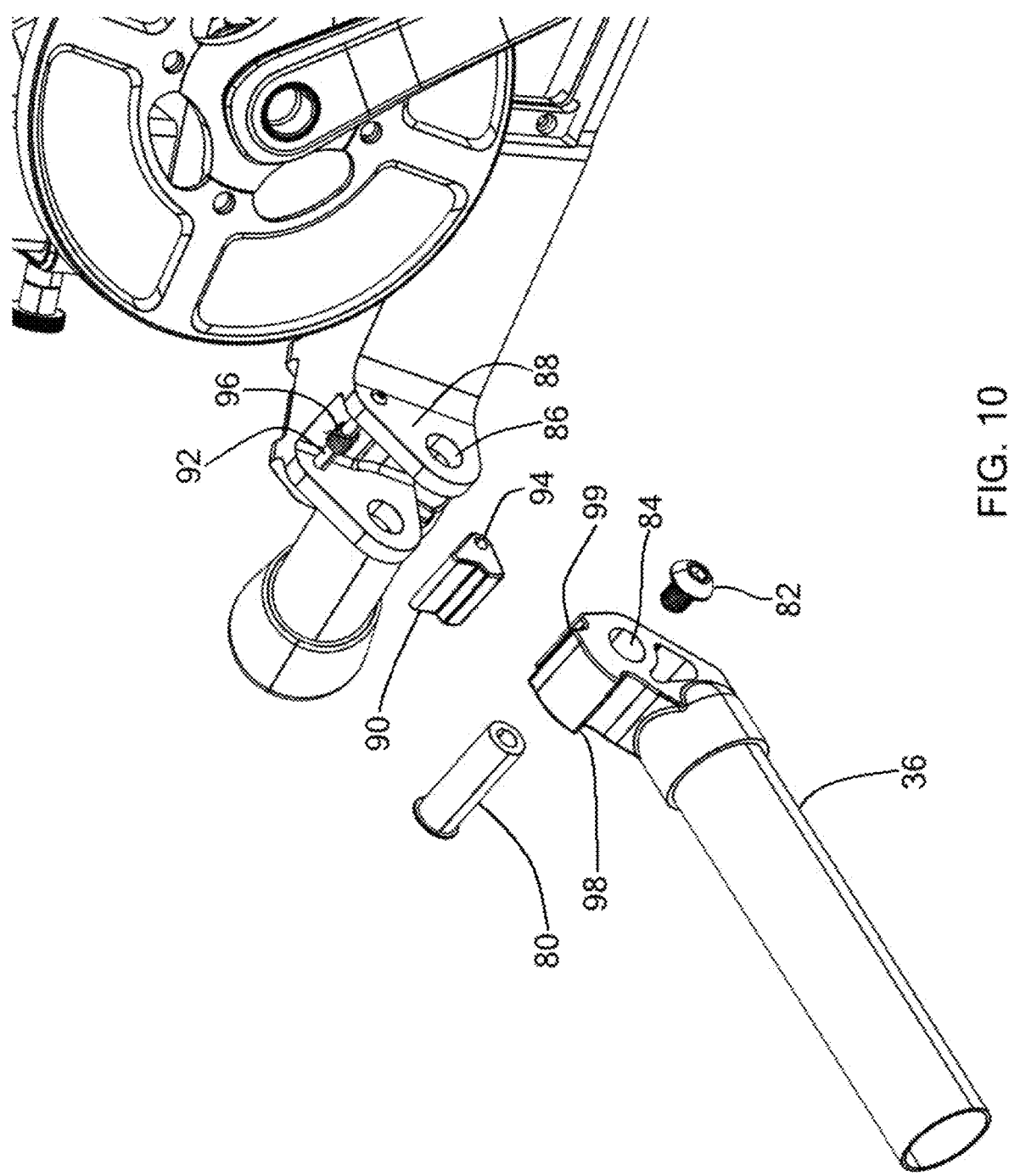
FIG. 10 illustrates a partially exploded perspective view of the folding leg assembly of the folding exercise bike of FIG. 1.

Referring to FIG. 10, the leg folding mechanism is shown, according to an exemplary embodiment of the present invention. The leg 36 may pivot about a pivot pin 80 that extends through a hole 84 at a proximal end of the leg 36 and a bracket hole 86 in a leg bracket 88 formed integrally with the lower frame member 46. A pin connector 82 may keep the pivot pin 80 in place and prevent removal thereof. A cam 90 can be pivotably mounted on a cam pin 92 that extends through a hole 94 in the cam 90. A spring 96 urges the cam 90 into a locked position, there the cam fits into either a deployed position leg lock detent 99 or into a folded position leg lock detent 98. The cam 90 can be moved, against the action of the spring 96, to release the cam 90 from the detents 98, 99 to permit the leg to move between the folded position and the deployed position. Anti-slip feet, such as rubber feet, may be disposed on the ends of the legs 36 to prevent slippage of the bike during use thereof.

Figure 11:
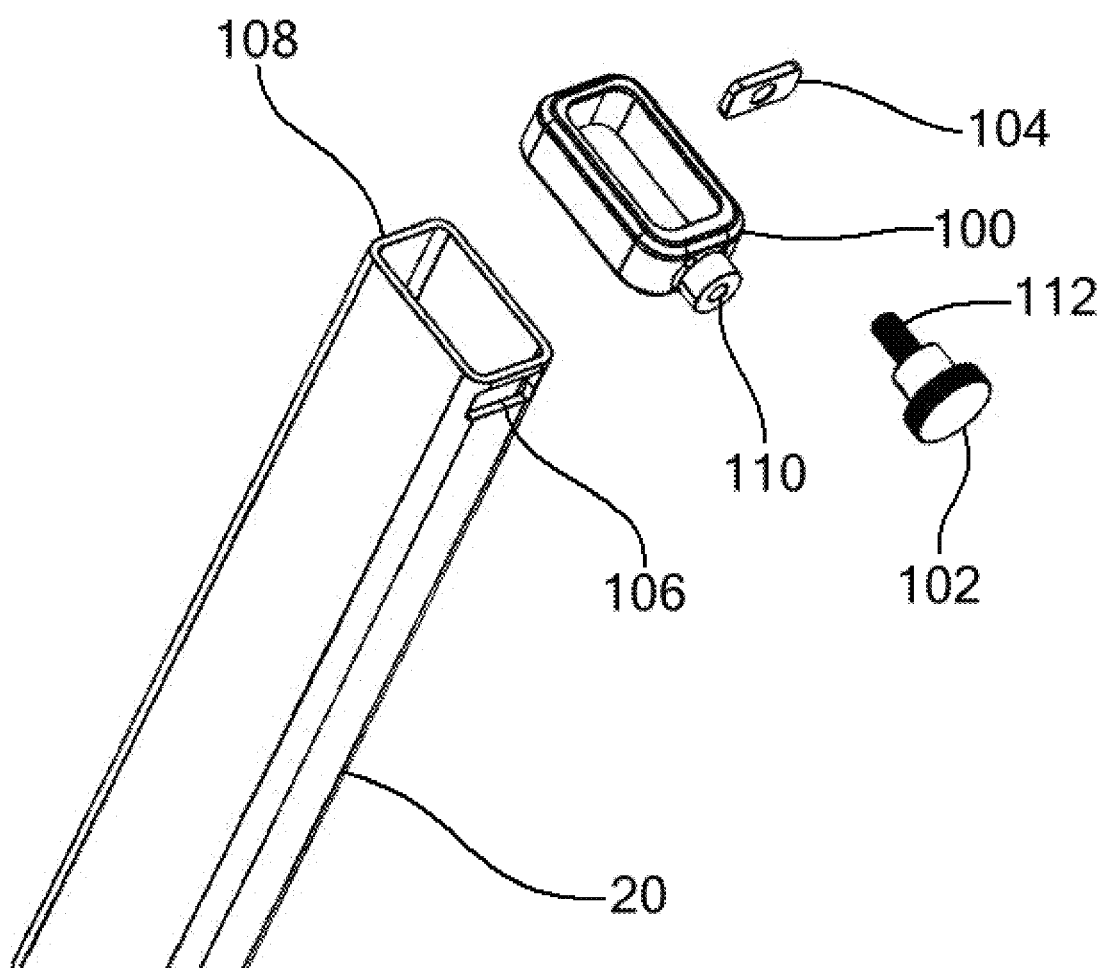
FIG. 11 illustrates a partially exploded perspective view of the telescoping assembly usable in the folding exercise bike of FIG. 1.

Referring to FIG. 11, an exemplary embodiment for the handlebar telescoping member clamp 24 is shown. The seat telescoping member clamp 32 may be designed in a similar manner. Of course, other clamp designs may be used to permit height adjustments. A clamp ring 100 can include a threaded hole 110 to receive threads 112 of a clamp knob 102. A clamp bar 104 can be attached at a distal end of the threads 112, inside the clamp ring 100. When the clamp knob 102 is loosened, the clamp bar 104 can fit into opening 106 on a top end 108 of the telescoping member 20, permitting telescoping member 22 (see FIG. 1) to fit and slide inside the telescoping member 20. When a desired height is selected, the clamp knob 102 can be tightened to permit the clamp bar 104 to press against the telescoping member 22, preventing telescoping between telescoping members 20, 22. Both the seat 12 and the handlebars 14 can be height adjustable via the clamps 24, 32. The number of telescoping members 20, 22 may vary to provide different degrees of height adjustment.

Figure 11A:
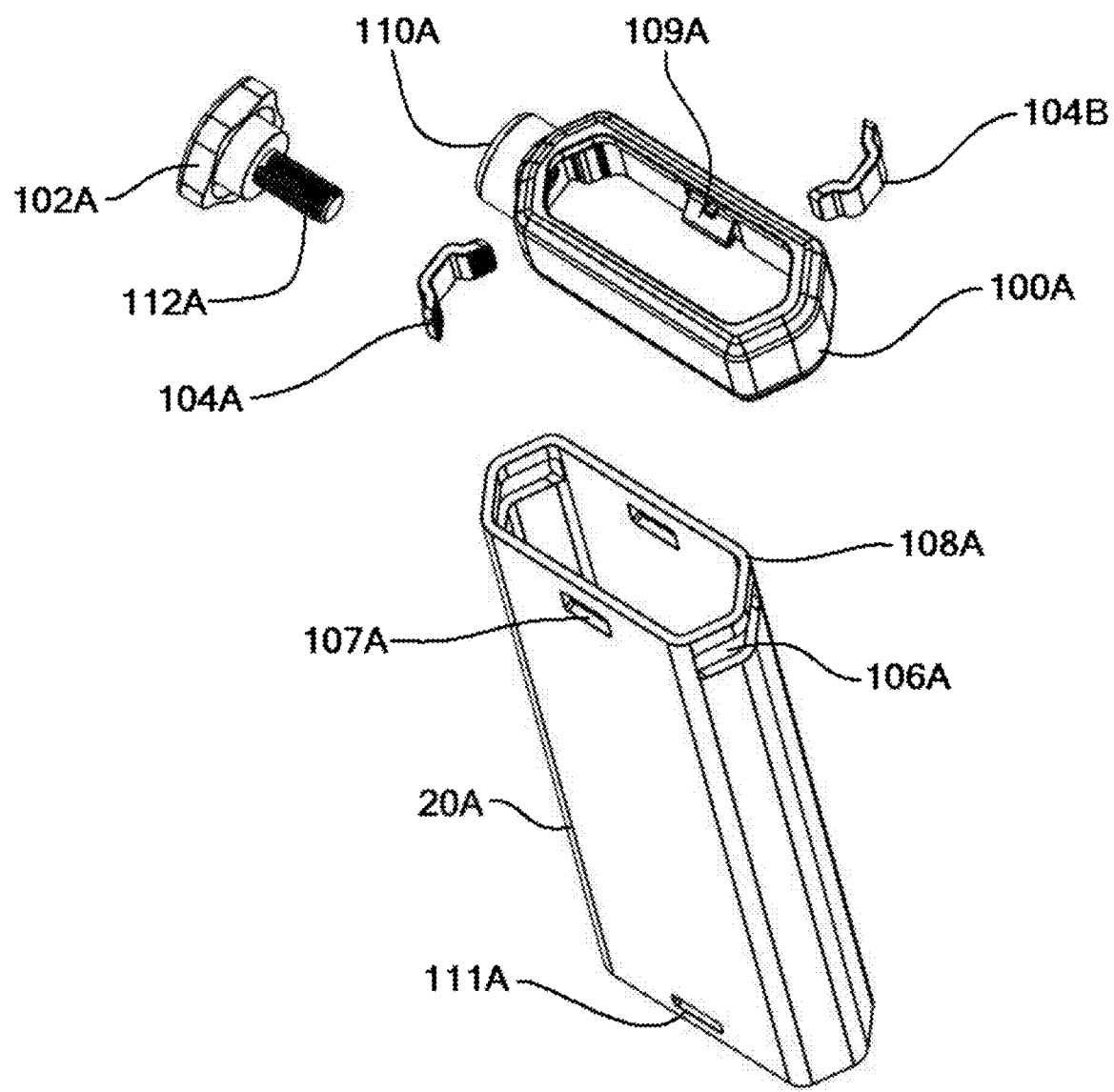
FIG. 11A illustrates a partially exploded perspective view of another embodiment of the telescoping assembly usable in the folding exercise bike of FIG. 1.

Referring to FIG. 11A, another exemplary embodiment for the handlebar telescoping member clamp 24 is shown. The seat telescoping member clamp 32 may be designed in a similar manner. Of course, other clamp designs may be used to permit height adjustments. A clamp ring 100A can include a threaded hole 110A to receive threads 112A of a clamp knob 102A. A clamp bar 104A can be attached at a distal end of the threads 112A, inside the clamp ring 100A. The clamp bar 104A may be shaped to contact the telescoping member at three locations. When the clamp knob 102A is loosened, the clamp bar 104A can fit into opening 106A on a top end 108A of the telescoping member 20A, permitting telescoping member 22 (see FIG. 1) to fit and slide inside the telescoping member 20A. When a desired height is selected, the clamp knob 102A can be tightened to permit the clamp bar 104A to press against the telescoping member 22, preventing telescoping between telescoping members 20A, 22. An opposing clamp bar 104B may be provided on the clamp ring 100A to extend through an opening 106A on an opposite side of the telescoping member 20A, providing additional contact an multiple locations on the telescoping member as the clamp knob 102A is tightened. Further, resiliently depressible tabs 109A may be disposed on opposite sides of the clamp ring 100A to fit into openings 107A on the telescoping member 20A. These tabs 109A may fit into openings 111A on telescoping member 22 (openings 111A on telescoping member 20A is shown in the figure, where similar openings 111A are present on telescoping member 22) when the telescoping member 20A is fully extended.

Figure 13:
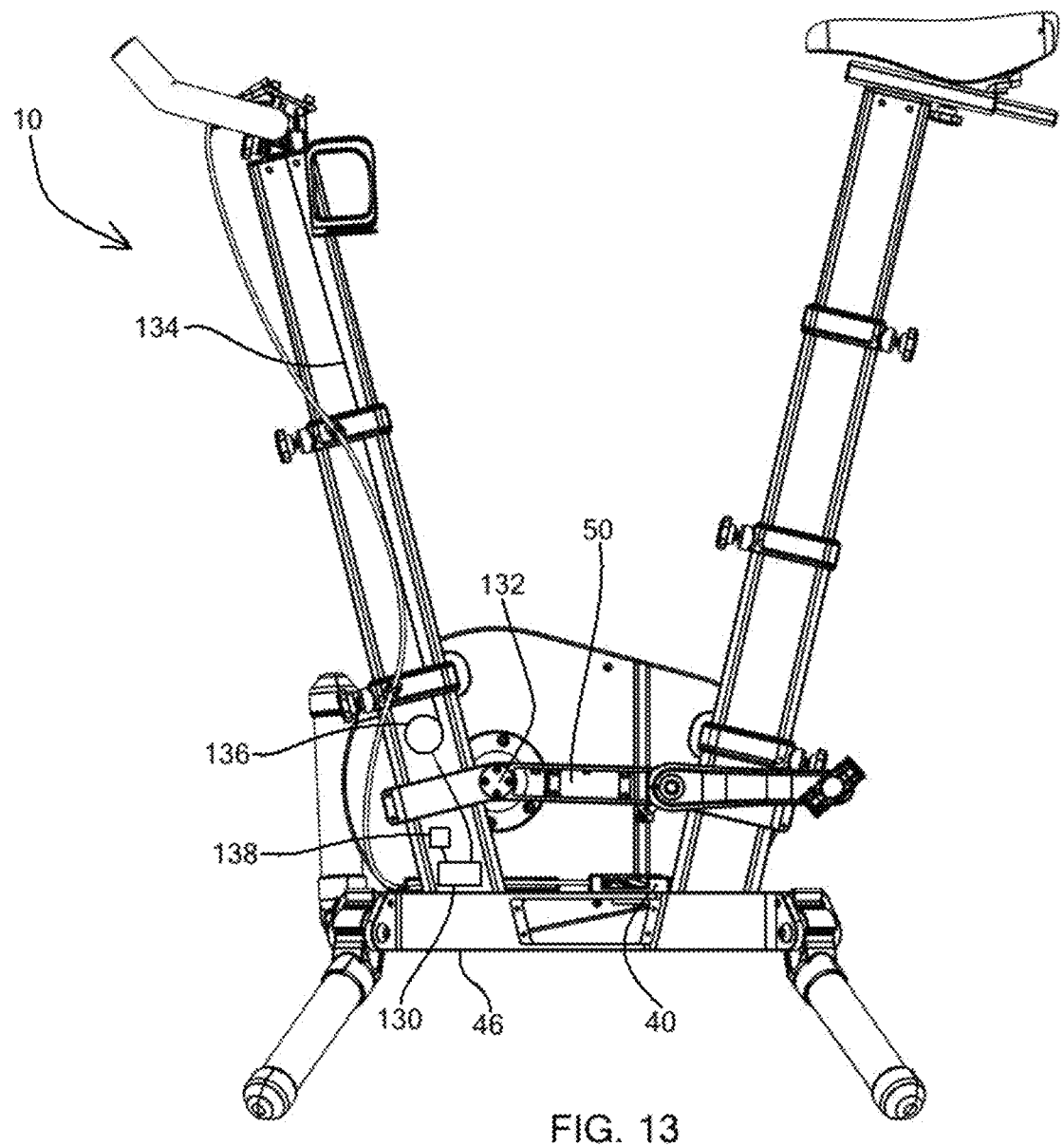
FIG. 13 illustrates electronics usable in the folding exercise bike of FIG. 1.

Referring to FIG. 13, a side view of the exercise bike 10 is shown with optional electronics. Such electronics can include a battery pack 130 for storing electrical energy. The battery pack 130 may be charged with a power generator 132 that can provide a charging current to the battery pack 130 when the flywheel 62 is turning. Thus, use of the bike 10 can maintain a charge in the battery pack 130. Optionally, a port (not shown) may be provided to charge the battery pack 130 from an external power source.

The battery pack 130 can power a wireless transmitter 138 that can provide communications with an external electronic device 140, such a smartphone. Data, such as time, mileage, heart rate, calories burned, resistance setting, and the like may be sent via the wireless transmitter 138 to the external electronic device 140. In some embodiments, the wireless transmitter 138 can include elements of a conventional power meter so that the data received can be analyzed within the bike itself prior to sending to the electronic device 140. Such on-board data analysis can reduce the amount of data that is sent to the electronic device 140, if desired for a particular application.

The battery pack 130 an provide power to the charge port 56, as described above. A power cord 134 can extend from a retraction reel 136 that can automatically take in excess amounts of the power cord 134 when the handlebar telescoping members 20, 22 are in the folded position. When the user deploys the handlebars 14, the power cord 134 can automatically extend from the retraction reel 136.

The battery pack 130 may provide power to the tension adjuster 44 which may include a wireless transmitter to permit friction adjustment to be provided by a remote electronic device. For example, a user is using a smartphone application with an interactive fitness bike workout that can include automatic friction adjustment to mimic cycling on various slopes, for example.

Figure 14:
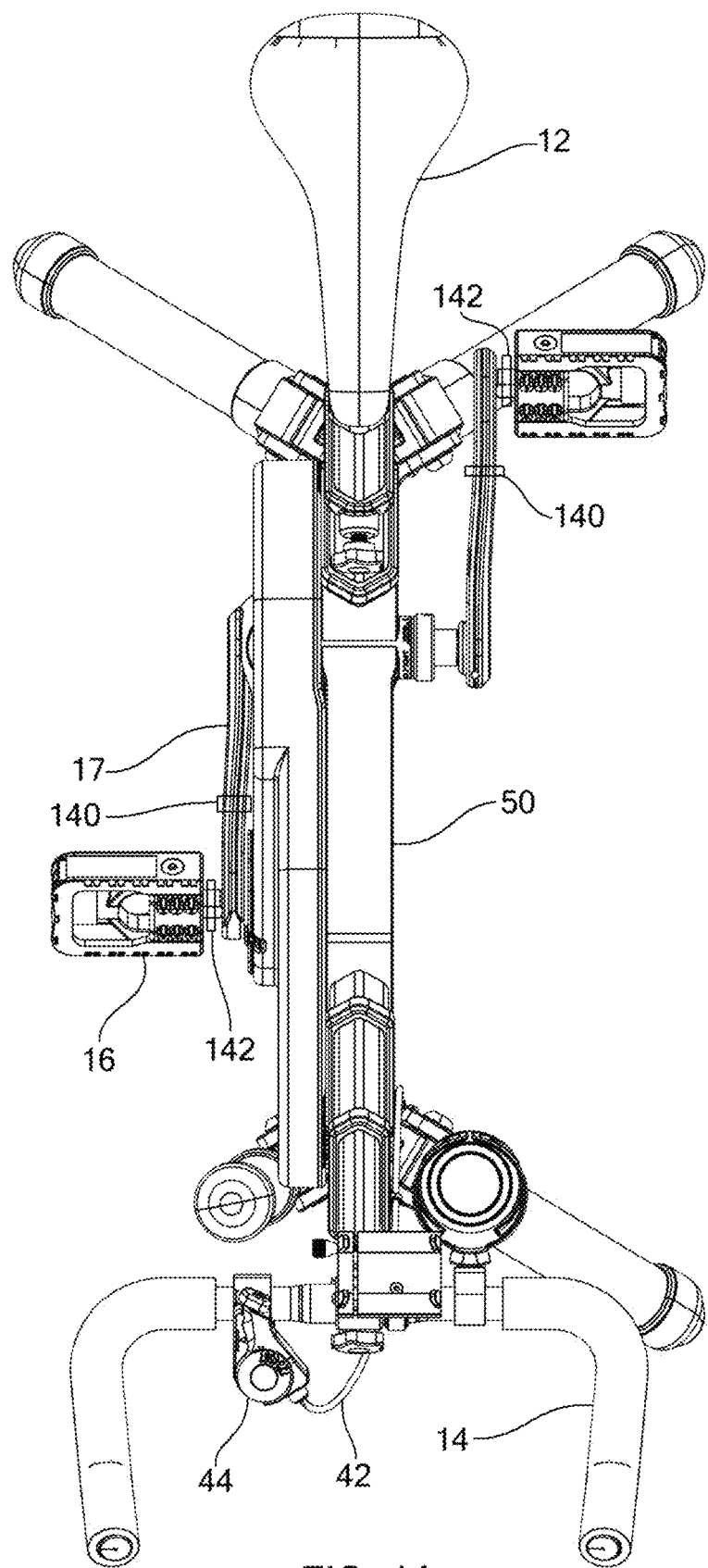
FIG. 14 illustrates folding options for the folding exercise bike of FIG. 1.

Referring to FIG. 14, in some embodiments, the crank arms 17 may have a pivot point 140 that permits the pedals 16 to fold into a position above the upper frame member 50, thus reducing the width of the bike 10 in the folded configuration. The pivot point 140 can pivot via known mechanisms and may include a lock to prevent inadvertent pivoting during use of the bike 10. The pivot point 140 can pivot via a pivot pin, a ball and socket type joint, a pivot slide arm and channel, or the like. Similarly, in some embodiments, the pedals 16 may attach to the crank arms 17 via a pivoting connection 142 permitting the pedals to fold along a plane of the crank arms 17, thus reducing a width of the bike 10 in the folded position.

Figure 15:
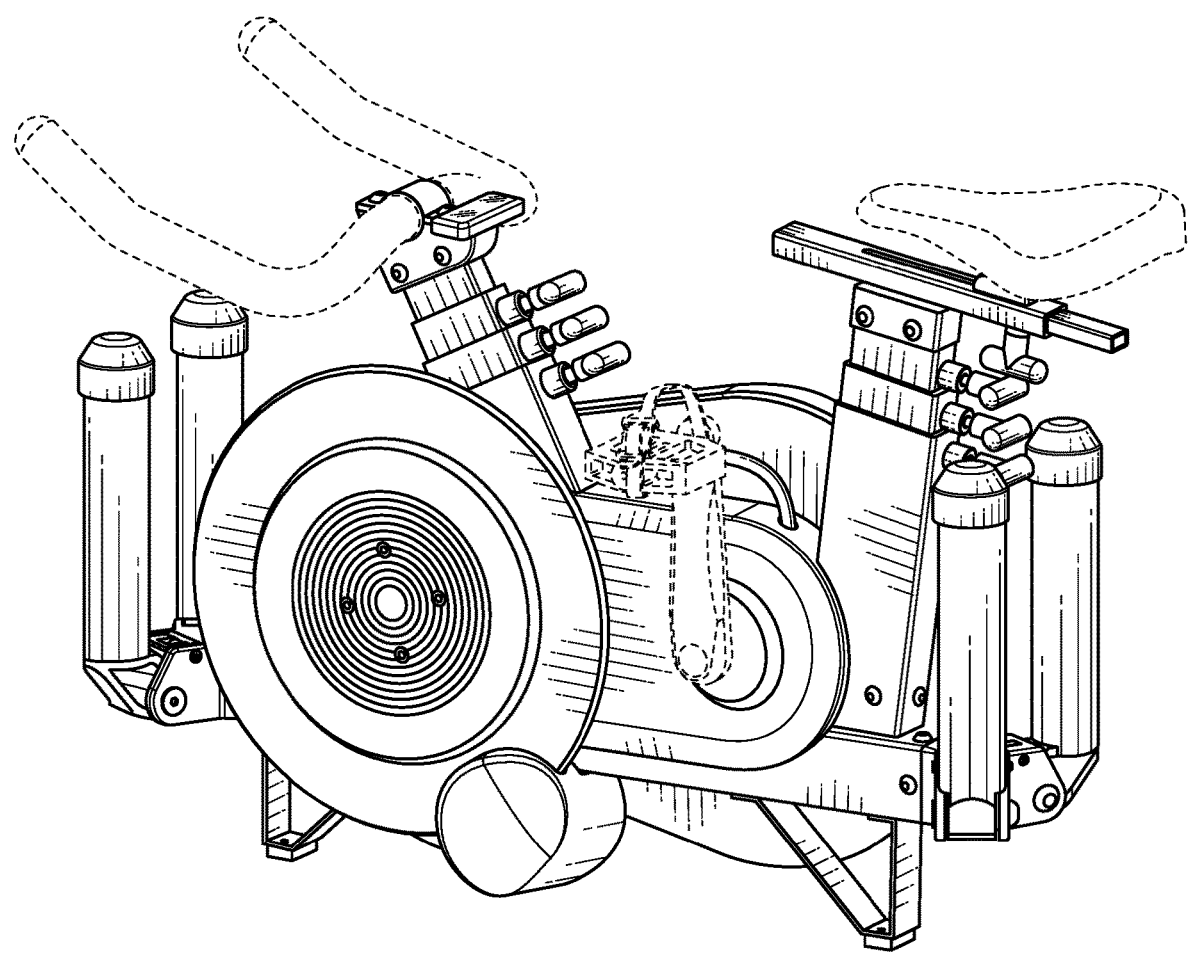
FIG. 15 illustrates a folded view of the exercise bike of FIG. 1.

FIG. 15 illustrates the folding bike in a folded configuration with the pedals removed to create a smaller size. As described above, pedal or crank arm folding arrangements may be provided so that folding does not require the removal of the pedals, for example.

In some embodiments, a transport case (not shown) can be used to house the bike 10 in the folded configuration. As discussed above, in some embodiments, the transport case can have a size to allow it to qualify as an airline carry-on bag. The case may include wheels to assist the use with transport and storage. In some embodiments, the case may be entirely removed during use.

In some embodiments, including the embodiments shown in the Figures and briefly discussed above, the folding exercise bike can include active shocks for user comfort and less shock while riding. Further, embodiments can include interactive experiences, such as those provided with electronic devices, displays and the like, as may be used on conventional exercise bicycles.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A folding exercise bike comprising:
   handlebars;
   handlebar telescoping members having a first handlebar telescoping member end attached to the handlebars;
   a seat;
   seat telescoping members having a first seat telescoping member end attached to the seat;
   a lower frame member interconnecting a second opposite end of the seat telescoping members and the handlebar telescoping members;
   a drive wheel turnable by pedals;
   a tension adjuster providing resistance to rotation of the drive wheel;
   a plurality of legs supporting the lower frame member on a surface, each of the plurality of legs movable between a deployed position for use of the folding exercise bike, and a folded position with the plurality of the legs folded upward toward either the seat or the handlebars; and
   a charge port formed in an exterior surface of the folding exercise bike.

2. The folding exercise bike of claim 1, further comprising a flywheel attached via a belt to the drive wheel, wherein the tension adjuster applies a variable pressure against the flywheel.

3. The folding exercise bike of claim 2, further comprising a generator to provide power to the charge port based on rotation of one of the flywheel or the drive wheel of the folding exercise bike.

4. The folding exercise bike of claim 3, further comprising a battery pack receiving energy from the generator, wherein the charge port receives power from the battery pack.

5. The folding exercise bike of claim 1, further comprising a crank arm at each side of the drive wheel connecting the drive wheel to the pedals.

6. The folding exercise bike of claim 1, further comprising a retracting reel permitting a power cord to retractably extend from the retracting reel to the charge port, wherein the retracting reel takes up the power cord when the handlebar telescoping members are moved from an extended position to a retracted position.

7. The folding exercise bike of claim 1, further comprising a wireless transmitter operable to send use data from the folding exercise bike to an external computing device.

8. The folding exercise bike of claim 5, further comprising a pivot point along a length of the crank arm to permit folding of the pedals toward a central axis of the folding exercise bike.

9. The folding exercise bike of claim 5, further comprising pivot points at a connection between the pedals and the crank arm permitting the pedals to fold relative to the crank arm.

10. The folding exercise bike of claim 1, further comprising a cam locking each of the plurality of legs into either the folded position or the deployed position.

11. The folding exercise bike of claim 1, wherein the plurality of legs, in the folded position, extend generally parallel with the seat telescoping members and the handlebar telescoping members.

12. The folding exercise bike of claim 1, wherein the charge port is formed in the handlebars.

13. The folding exercise bike of claim 1, further comprising an upper frame member supporting a lowermost one of each of the handlebar telescoping members and the seat telescoping members.

14. The folding exercise bike of claim 1, wherein the tension adjuster is mounted on the handlebars.

15. A folding exercise bike comprising:
   handlebars;
   handlebar telescoping members having a first handlebar telescoping member end attached to the handlebars;
   a seat;
   seat telescoping members having a first seat telescoping member end attached to the seat;
   a lower frame member interconnecting a second opposite end of the seat telescoping members and the handlebar telescoping members;
   an upper frame member interconnecting lowermost ones of the handlebar telescoping members and the seat telescoping members;

a drive wheel turnable by pedals;

a flywheel turnable by the drive wheel;

a tension adjuster providing resistance to rotation of the flywheel;

a plurality of legs supporting the lower frame member on a surface, each of the plurality of legs movable between a deployed position for use of the folding exercise bike, and a folded position with the plurality of legs folded upward toward either the seat or the handlebars;

a charge port formed in the handlebars;

a battery pack;

a charge cord extending inside the handlebar telescoping members and interconnecting the battery pack with the charge port; and a retracting reel to automatically retract the charge cord when the handlebar telescoping members are moved into a retracted position.

16. The folding exercise bike of claim 15, further comprising a generator operable to charge the battery pack when a user turns the drive wheel.

17. The folding exercise bike of claim 15, further comprising a cam locking each of the plurality of legs into either the folded position or the deployed position.

18. The folding exercise bike of claim 15, wherein the plurality of legs, in the folded position, extend generally parallel with the seat telescoping members and the handlebar telescoping members.

19. A folding exercise bike comprising:

handlebars;

handlebar telescoping members having a first handlebar telescoping member end attached to the handlebars;

a seat;

seat telescoping members having a first seat telescoping member end attached to the seat;

a lower frame member interconnecting a second opposite end of the seat telescoping members and the handlebar telescoping members;

a drive wheel turnable by pedals;

a tension adjuster providing resistance to rotation of the drive wheel, wherein the tension adjuster is mounted on the handlebars; and a plurality of legs supporting the lower frame member on a surface, each of the plurality of legs movable between a deployed position for use of the folding exercise bike, and a folded position with the plurality of legs folded upward toward either the seat or the handlebars.

20. The folding exercise bike of claim 19, further comprising a charge port formed in an exterior surface of the folding exercise bike.

* * * * *